United States Patent [19]
Meeker et al.

[11] Patent Number: 4,714,422
[45] Date of Patent: Dec. 22, 1987

[54] ROTARY PLASTICATOR SCREW INJECTION MACHINE

[75] Inventors: Gregory W. Meeker, Webster; Norris E. Bleck, Rochester, both of N.Y.; Marc A. Rizzi, Orange; Carl M. Irick, Monroe, both of Conn.

[73] Assignee: Farrel Corporation, Ansonia, Conn.

[21] Appl. No.: 808,231

[22] Filed: Dec. 12, 1985

Related U.S. Application Data

[63] Continuation of Ser. No. 612,682, May 22, 1984, abandoned.

[51] Int. Cl.⁴ ............................................. B29C 45/02
[52] U.S. Cl. .................................... 425/204; 264/210.1; 366/78; 366/79; 366/97; 366/99; 425/207; 425/209; 425/376 R; 425/376 B
[58] Field of Search .................... 425/147, 192 R, 204, 425/209, 374, 376 R, 376 B, 466, 569, 557, 207; 366/76, 77, 78, 79, 97, 99; 264/210.1

[56] References Cited

U.S. PATENT DOCUMENTS

| | | | |
|---|---|---|---|
| 3,262,154 | 7/1966 | Valyi | 264/211.1 |
| 3,545,041 | 12/1970 | Maxwell | 425/203 |
| 3,596,326 | 8/1971 | Annis et al. | 425/192 R |
| 3,863,905 | 2/1975 | Maxwell | 425/208 |
| 4,142,805 | 3/1979 | Tadmor | 366/97 |
| 4,194,841 | 3/1980 | Tadmor | 425/209 |
| 4,227,816 | 10/1980 | Hold et al. | 366/99 |
| 4,329,065 | 5/1982 | Hold et al. | 366/97 |
| 4,421,412 | 12/1983 | Hold et al. | 366/76 |

Primary Examiner—Jay H. Woo
Assistant Examiner—Timothy W. Heitbrink
Attorney, Agent, or Firm—Parmelee, Bollinger & Bramblett

[57] ABSTRACT

A plasticating unit having a channeled rotor rotating in an annular housing for processing plastic or polymeric material. The processed material is fed by a screw to a chamber which expands to receive a predetermined charge of material for injection into a mold.

8 Claims, 9 Drawing Figures

ROTARY PLASTICATOR SCREW INJECTION MACHINE

This is a continuation of copending application Ser. No. 612,682 filed on May 22nd 1984 now abandoned.

FIELD OF THE INVENTION

This invention relates to machines for injection molding plastic.

BACKGROUND OF THE PRIOR ART

It is known in the field of injection molding plastic material to melt, mix and otherwise process plastic by feeding solid plastic such as in granular form through a hopper to the flight of a screw rotating in a barrel. In the usual course of events the screw flights are appropriately dimensioned to melt the solid plastic and to otherwise process and pump the melted material toward an outlet which may be connected to the cavity of a mold. Such a machine is shown in U.S. Pat. No. 3596326 in which a screw is rotated to plasticate and otherwise process plastic material. The flights of this screw as noted above have various configurations to perform different operations and in length may be more than twenty times the diameter of the screw.

It is common for the last stages of the screw to force the melted material past a non-return valve to a collection chamber at the outlet end of the barrel containing the screw. As the material collects, the screw is forced axially backward, therebeing a suitable shut-off valve at the outlet. When an amount of plastic has collected sufficient to fill the mold cavity, rotation of the screw is stopped, the outlet valve is opened and the screw is moved forward to force the melted material into the mold cavity where the material is cooled or otherwise reacted to solidify in the cavity to form a desired article. As should be apparent the length of the screw needed to perform the desired operations to plasticate and process the material as well as the length of machine needed to accommodate the reciprocation of the screw dictates that such reciprocating screw injection molding machines be of considerable length.

There has been recently developed by the Farrel Division of USM Corporation an apparatus known as the DISKPACK Processor for processing plastic material with greater efficiency than the screw of an extruder or injection molding machine. Such an apparatus is typically shown and described in U.S. Pat. Nos. 4142805, 4329065 and 4227816. These patents show a multi-stage rotary processor for plastic and polymeric materials which are or become in the course of processing viscous liquids. An annular housing rotatably receives a rotor having in its cylindrical surface a plurality of annular channels forming with the close fitting housing a plurality of processing passages. Transfer passages conduct the material from passage to passage after processing and finally to a relatively narrow and deep channel which provides pumping pressure to force the processed material from an outlet which may be a die for shape extrusion or which may conduct the material for further processing in another device. It is known that considerable energy is expended in the narrow pumping channels of the DISKPACK Processor.

BRIEF SUMMARY OF THE INVENTION

It is an object of the invention to provide a machine for injection molding plastic or polymeric material which is considerably more efficient and which is considerably smaller than equipment heretofore available.

To this end, there is provided a combination of a plasticating unit known as a DISKPACK Processor and a screw in a sleeve for pressurizing and feeding material melted and/or plasticated in the processor to an expandable chamber in a barrel having a nozzle communicating with a mold. The plasticator includes a rotor having channels in its cylindrical surface which with an annular housing receiving the rotor form processing passages for the material to be operated on. The moving walls of the channels on the rotor drag the material toward one or more blocks which restrain the body of material so relative movement at the boundary of the material and walls cause shearing forces which plasticate the material. The blocks direct melted and/or plasticated material from channel to channel and to an outlet area leading to one end of the screw.

The screw feeds the material through a one way valve to a chamber which enlarges as the material forces the screw and its sleeve to retract in the barrel. When a predetermined charge of material is in the chamber, the screw and rotor are stopped and fluid operated cylinders force the sleeve and screw toward the nozzle to inject the material into the mold.

DESCRIPTION OF THE PREFERRED EMBODIMENT

Figure 1:
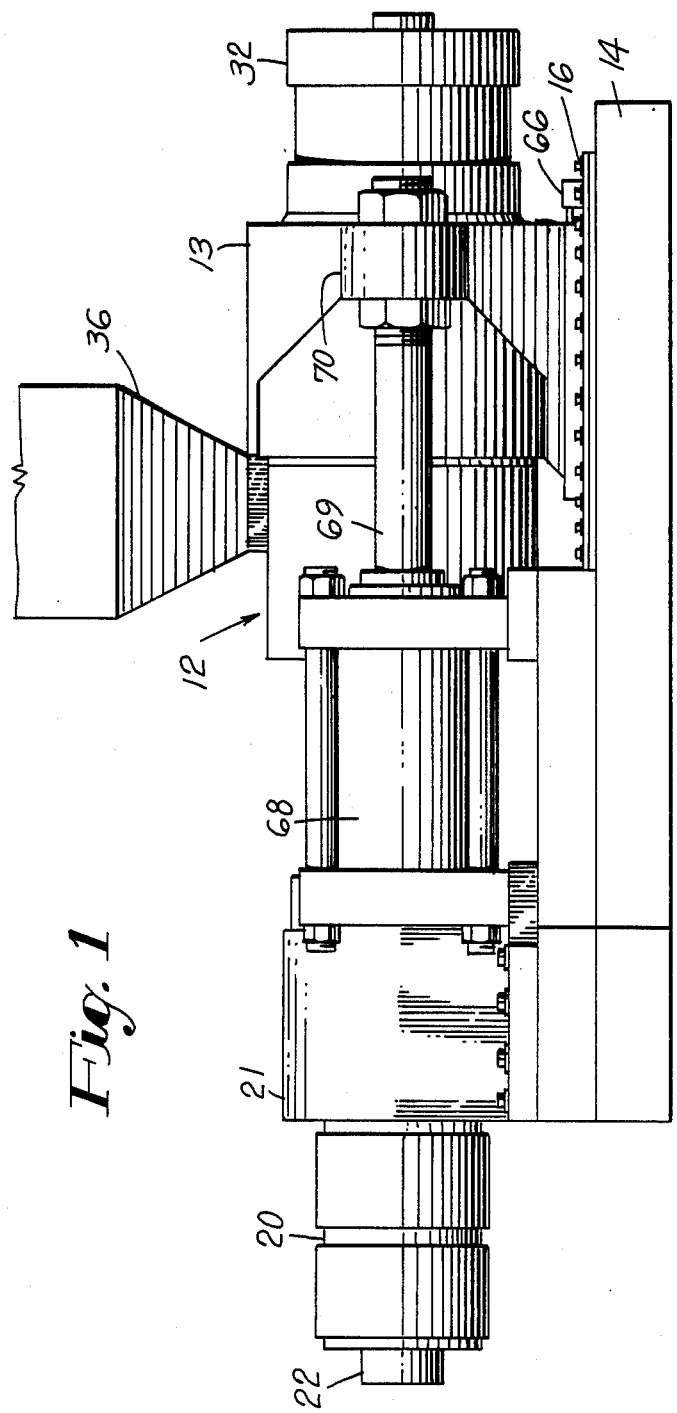
FIG. 1 is a side elevation of an injection molding machine embodying the invention.
Figure 2:
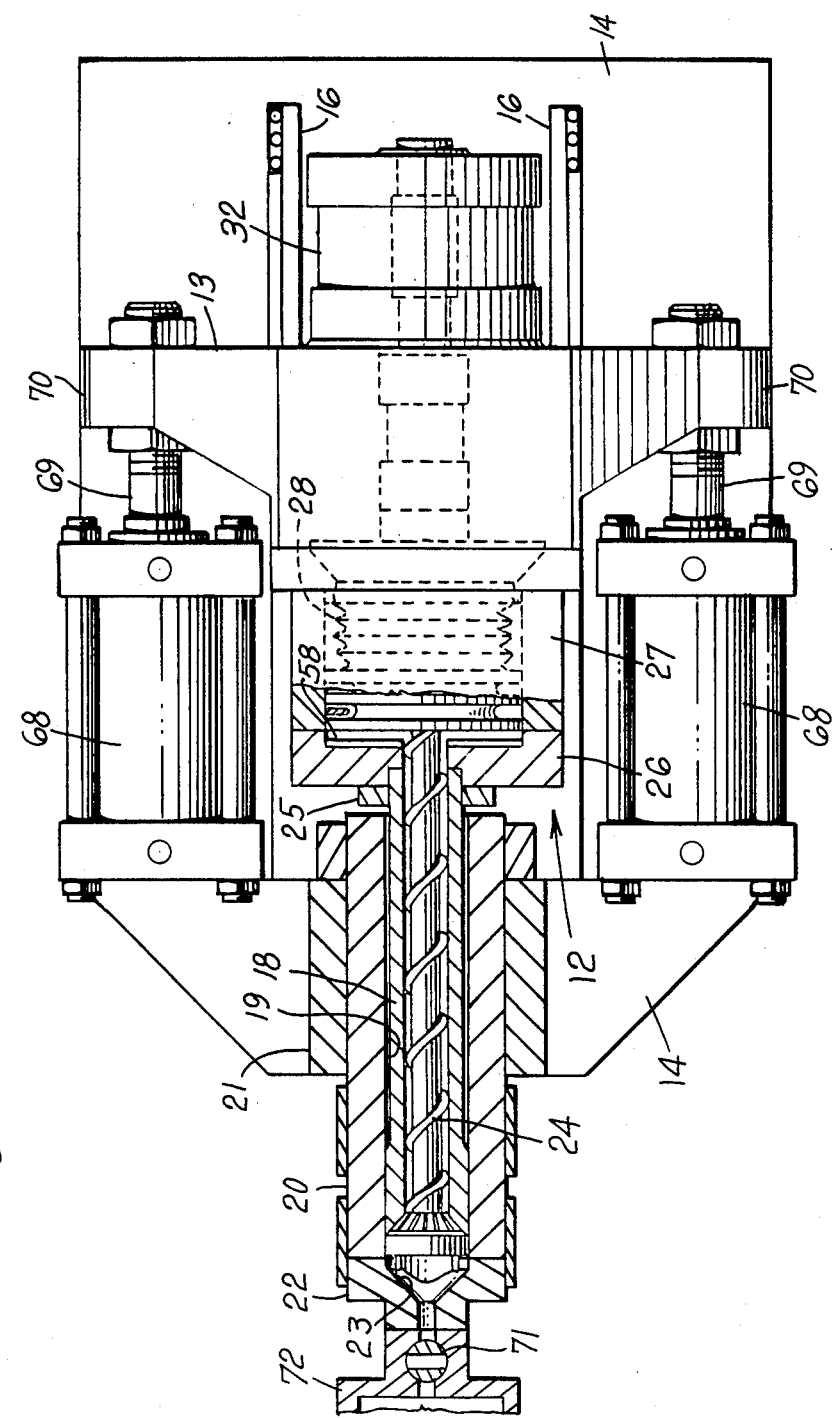
FIG. 2 is a plan view of the machine shown in FIG. 1 with parts broken away showing the various parts in positions assumed after injecting plastic into a mold.
Figure 3:
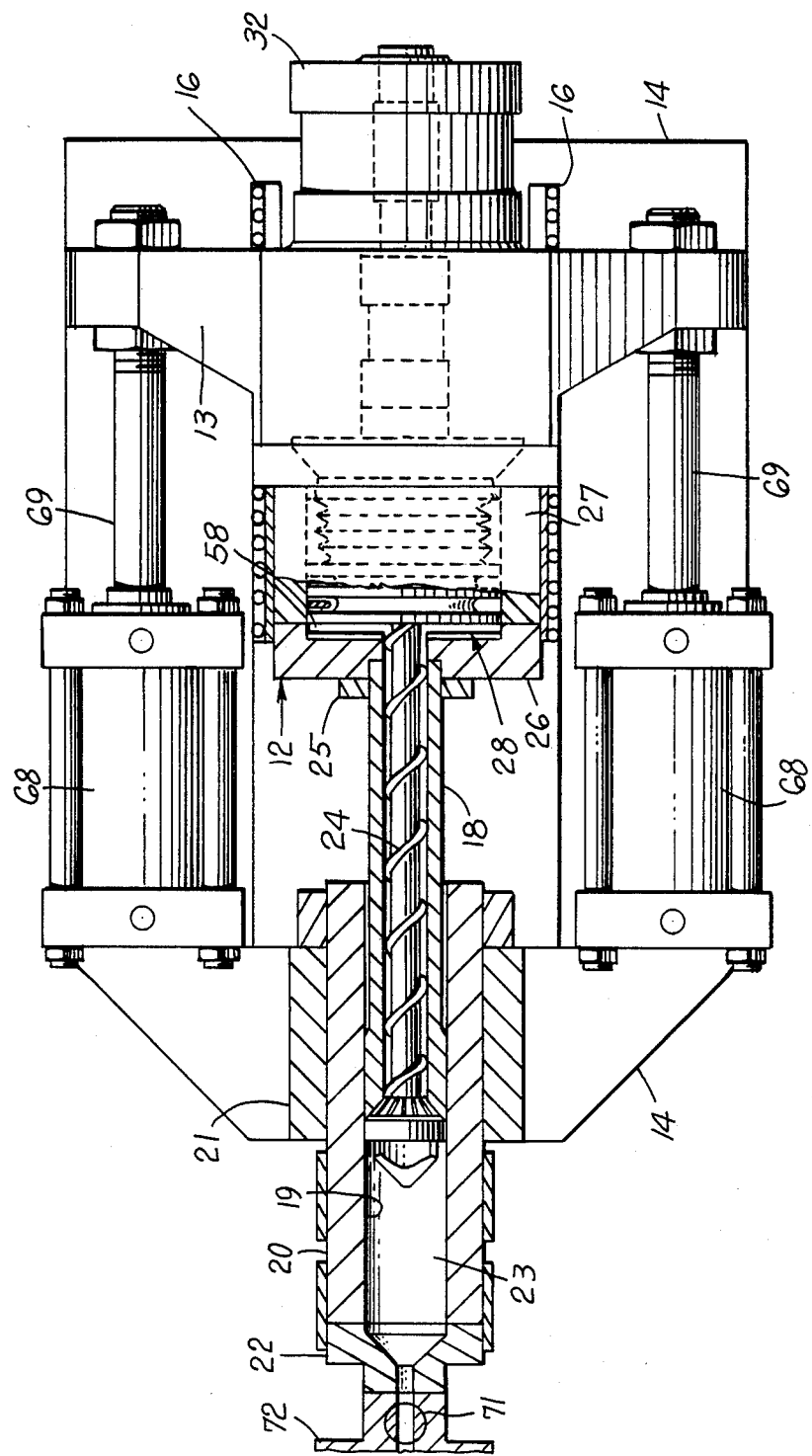
FIG. 3 is a view similar to FIG. 2 with the various parts in positions assumed when the machine is fully charged.
Figure 4:
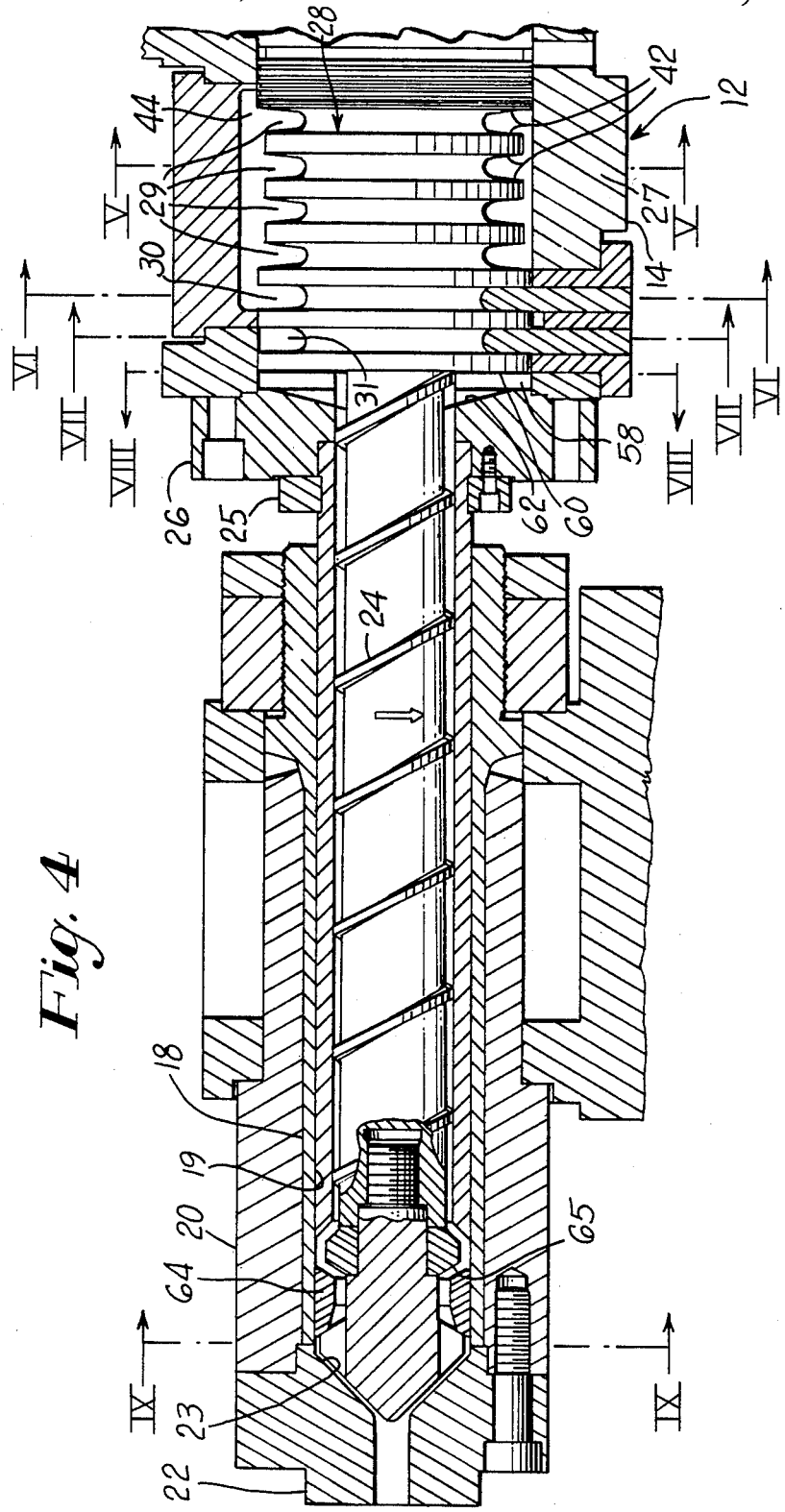
FIG. 4 is a view in section on lines IV—IV of FIG. 1 and showing parts of the machine in enlarged scale.

Referring to FIG. 1 there is shown an injection molding machine comprising a plasticating unit 12 mounted on a bracket 13 guided for reciprocation in guideways 16 on a base 14. As best seen in FIGS. 2 and 3, the unit 12 has secured thereto a sleeve 18 received for reciprocation in a bore 19 in a barrel 20 secured to the base 14 through a bracket 21. The barrel is provided with a nozzle 22 which communicates with the bore 19 so that by retraction of the sleeve 18 from the position seen in FIG. 2 to that seen in FIG. 3 an expandable chamber 23 is formed. As best seen in FIG. 4, the sleeve 18 is secured by a split ring 25 to an end cap 26 bolted to one end of an annular housing 27 of the plasticator unit 12.

The plasticator unit 12 includes the housing 27 secured by bolts (not shown) to the bracket 13. The housing rotatably receives a rotor 28 having in its cylindrical surface a plurality of annular channels 29, 30 and 31 which with the relatively close fitting housing form processing passages. The rotor is driven in rotation by a motor which as shown is a hydraulic motor 32. However, any suitable type of rotary motor could be used without departure from the scope of the invention. One end of the screw 24 is fixed to the rotor 28 so that rotation of the motor causes the rotor and screw to be driven in unison. Other means could be used to rotate the screw separately and the rotor and screw could be rotated at different speeds or one stopped and the other rotating without departing from the scope of the invention.

Figure 5:
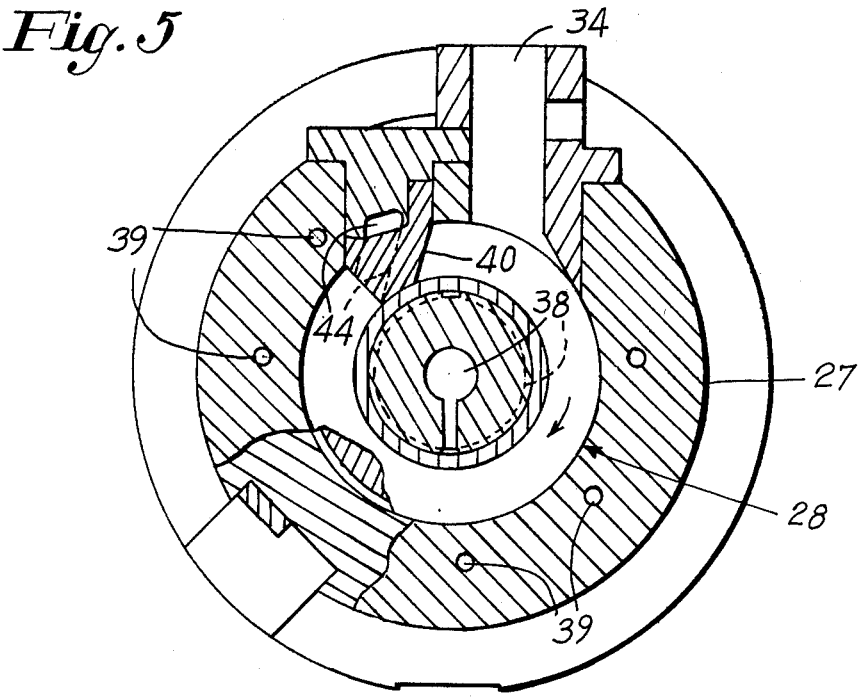
FIG. 5 is a section on line V—V of FIG. 4.

The plasticator unit 12 is provided with an inlet slot 34 (FIG. 5) through which granular plastic or polymeric material is fed from a hopper 36 (FIG. 1) through the housing to the channels 29. It should be obvious that other means for feeding plastic or polymeric material in solid or liquid state could be provided without departing from the scope of the invention. The rotor and/or the housing may be provided with passages 38 and 39 respectively for circulation of temperature control fluid to provide temperature suitable for melting or otherwise processing the plastic or polymeric material fed to the channels 29. As best seen in FIG. 5, the housing is provided with channel blocks 40 which extend into each channel 29. As the motor 32 rotates the rotor 28 the material to be melted or otherwise processed is restrained by each block 40 which has a cross-sectional shape closely complementary to the channel while the moving side walls 42 (FIG. 4) drag the body of the material toward the block and the adjacent walls and material boundaries are moved relatively and by friction or shearing forces, act on the material to melt or otherwise process the material. The channel block 40 is provided with passages 44 through which melted or processed material passes from one channel 29 to the next.

Figure 6:
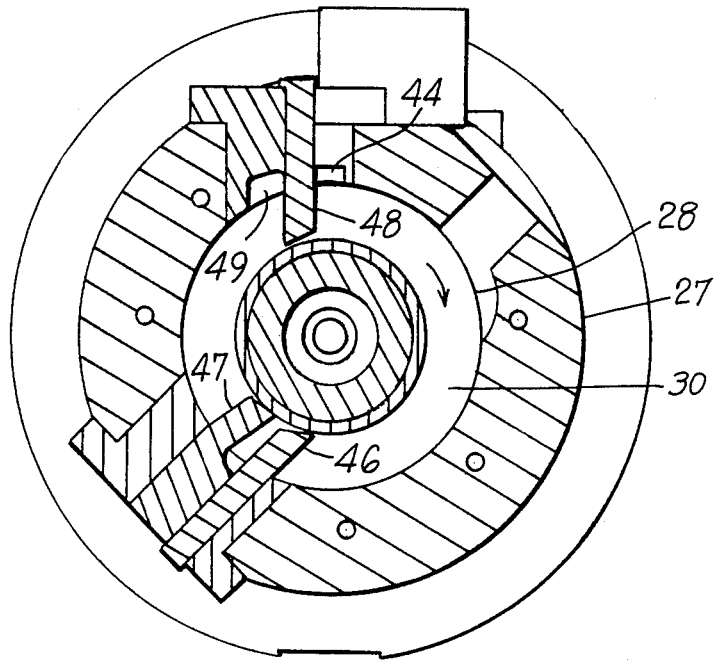
FIG. 6 is a section on line VI—VI of FIG. 4.
Figure 7:
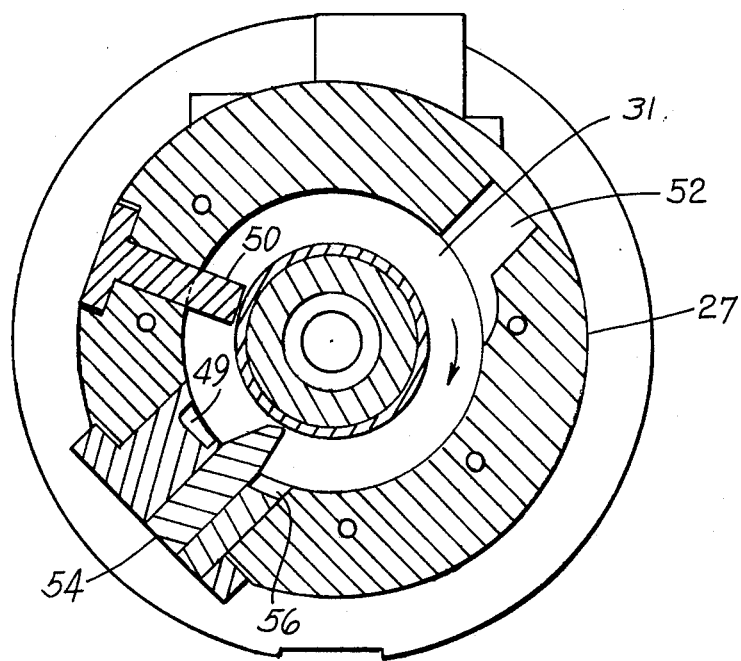
FIG. 7 is a section on line VII—VII of FIG. 4.
Figure 8:
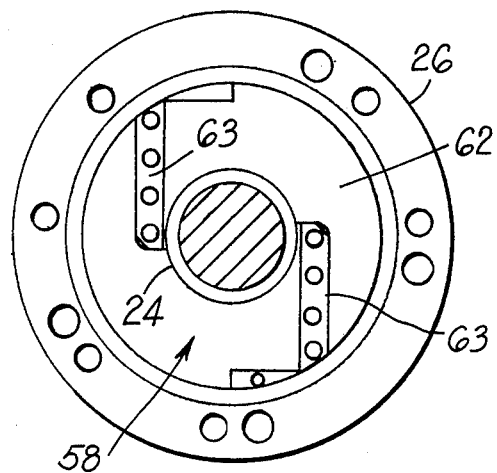
FIG. 8 is a section on line VIII—VIII of FIG. 4.
Figure 9:
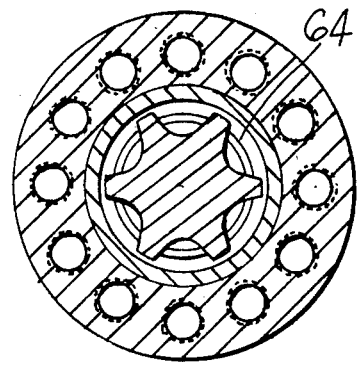
FIG. 9 is a section on line IX—IX of FIG. 4.

The melted or otherwise processed material may be fed from channel 29 to the next adjacent channel 29 in serial fashion or may be simultaneously processed in the channels 29 and thereafter fed in series to channels 30 and 31. As seen in FIG. 6 the molten or otherwise processed material is fed into the mixing channel 30 where one or more mixing fingers 46, 47 spread the material on the walls of the channel and otherwise mix the material. A finger 48 also extends into channel 30 to direct the mixed material through a passage 49 to the venting or devolitilizing channel 31. In the channel 31 (FIG. 7), the material is spread onto the walls of the channel in thin films by a spreading pin 50 and water or other liquid or gaseous undesirable elements escape from the material and are withdrawn through a port 52. The material is scraped from the walls of channel 31 by a channel block 54 and forced through a passage 56 to an outlet area 58 (FIG. 4). The outlet area 58 is formed between the end 60 of the rotor and an opposed face 62 of the end cap 26. The rotating end 60 of the rotor and the stationary face 62 of the end cap 26 cooperate to create a centripetal force to direct the material inwardly toward the screw 24. The cause and effect of centripetal force is well known and is described in U.S. Pat. Nos. 3863905 and 3545041 to which reference may be had for further information. The operation of the plasticating unit 12 is generally described in U.S. Pat. Nos. 4142805 and 4194841 which are incorporated herein by reference and which describe in general terms the DISKPACK Processor above referred to. For some materials, it may be necessary to enhance the centripetal force to urge the material toward the screw. To this end provision is made to secure angularly disposed elongate blocks 63 (FIG. 8) to the face 62 whereby material tending to rotate with the end of the rotor is scraped therefrom and directed by the blocks 63 toward the screw.

As above noted, the screw 24 is secured to the rotor 28 so as to be rotated in unison by the motor 32. The plasticated material is fed by the screw to the opposite end through a one way valve 64 into the expandable chamber 23. As the material is fed into the chamber, the screw, the sleeve 18 and the plasticator unit 12 are moved from the positions shown in FIG. 2 to that shown in FIG. 3. These units are guided in their retracting movements by the guideways 16 and the bore 19 in the barrel 20. An adjustable switch 66 (FIG. 1) is actuated by the movement of the bracket 13 and acts to stop rotation of the rotor 28 and the screw 24 and to cause operation of a pair of injection cylinders 68 secured to the base 14. Piston rods 69 extending from the cylinders are connected to lugs 70 of the bracket 13. During retraction of the screw 24 and sleeve 18, the cylinders 68 may be exhausted so as to apply no force or may be pressurized so as to cause a back pressure on the material in the screw to cause further processing of the material. The switch 66 is positioned so that the chamber 23 will be expanded to contain a predetermined charge of plasticated material sufficient to fill the cavity of a mold 72 communicating with the nozzle 22. A suitable shut-off valve 71 may be provided to control premature passage of material through the nozzle while the chamber is being charged. Actuation of switch 66 also causes the piston ends of the cylinders 68 to be pressurized and force the sleeve 18, screw 24 and plasticating unit 12 to the left from the position seen in FIG. 3 to that seen in FIG. 2. At this time, the one way valve 64 is forced into sealing relation with a shoulder 65 on the screw so the sleeve and screw act as a ram to force the material from the barrel chamber 23 into the cavity of the mold. At this time the shut-off valve 71 is moved to its open condition as seen in FIG. 3.

It should be apparent from the foregoing description that various substitutions of various elements and combinations thereof may be made without departing from the scope of the invention defined by the appended claims.

We claim:

1. Apparatus for injection molding plastic articles including the combination of:

a base, a rotary processor for plasticating plastic and polymeric material and mounted on said base for guided reciprocation, said processor comprising a housing having a rotor mounted for rotation in said housing, the rotor having a plurality of annular channels which provide moving surfaces of a plurality of annular passages which passages are closed by a mating surface of the housing, the housing having an inlet through which material to be plasticated is fed to at least one of the passages and fixed members projecting from the housing into the channels for restraining the material to be acted on by the moving surfaces and to direct the material to successive passages and toward an outlet section of the housing;

an elongate screw rotatable in a sleeve, an end of said sleeve being secured to and extending from the processor housing into a bore in a barrel, with a first end of the screw communicating with the outlet section of the processor and a second end of the screw communicating with a chamber formed in the bore at an other end of the sleeve;

motor means for rotating the rotor and the screw in unison for plasticating and otherwise operating on the material fed through the inlet and successive passageways, through the outlet section and along the screw into the chamber, the sleeve and the barrel being fixedly mounted to the processor housing for enlarging the chamber by reciprocation of the processor housing relative to the base, to accommodate plasticated material fed by the screw and for reducing the volume of the chamber for forcing the plasticated material therefrom;

and piston cylinder means acting between the barrel and the processor housing for following retraction of the sleeve during enlargement of the chamber and for driving the sleeve and screw therein axially in a direction opposite said retraction for forcing the plasticated material from the chamber.

2. Apparatus according to claim 1 in which the piston cylinder means is responsive to the chamber containing a predetermined volume of plasticated material to cause the sleeve and screw to be moved in said opposite direction to eject the material from the chamber.

3. Apparatus according to claim 1 in which the chamber communicates with a cavity of a mold through a nozzle.

4. Apparatus according to claim 2 in which the chamber communicates with a cavity of a mold through a nozzel.

5. Apparatus according to claim 1 in which the outlet section of the processor comprises a fixed face in the housing spaced from an end face of the rotor forming a gap to a peripheral area of which the plasticated material is directed from the rotor passages, the rotating face of the rotor and the fixed face of the housing coacting to cause a centripetal force forcing the material toward a central port communicating with said first end of the screw.

6. Apparatus according to claim 1 in which the outlet section of the processor comprises a fixed face in the housing spaced from an end face of the rotor forming a gap to which the plasticated material is directed from the rotor passages and vanes fixed to the end face of the rotor and angularly disposed with respect to an axis of rotation of the rotor to force the plasticated material toward the fist end of the screw.

7. Apparatus according to claim 1 in which the combination also includes a cross head to which the processor housing is secured, the cross head being mounted for reciprocation on the base in directions parallel to an axis of the screw and sleeve, the motor means for rotating the screw and rotor being mounted on the cross head and the piston cylinder means acting between the base and the cross head.

8. Apparatus for injection molding plastic articles said apparatus comprising a base, a rotary processor for plasticating plastic and polymeric material comprising a rotor mounted for rotation in a housing, the rotor having a plurality of annular channels which provide moving surfaces of a plurality of annular passages which are closed by a mating surface of the housing, the housing having an inlet through which material to be plasticated is fed into at least one of the passages, and fixed members projecting from the housing into the channels for restraining the material to be acted on by the moving surfaces and to direct the material to successive passages and toward an outlet section of the housing, an elongate screw connected to the rotor and rotatable in a sleeve, said sleeve having a hollow interior and being secured to and extending from the processor housing into a bore in a barrel, a first end of the screw communicating with the outlet section of the processor and a second end of the screw and an end of the sleeve extending into the bore to form a channel between an end of the bore and the end of the screw second and said end of the sleeve, motor means for rotating the rotor and screw in unison for plasticating and otherwise operating on the material fed through the inlet and successive passageways, through the outlet section and along the screw into the chamber, the barrel being mounted to the processor housing for enlarging the chamber by reciprocation of the processor housing carrying the screw and sleeve relative to the base to accommodate plasticated material fed by the screw and for reducing the volume of the chamber for forcing the plasticated material therefrom, piston cylinder means acting between the barrel and the processor housing for following retraction of screw and sleeve during enlargement of the chamber and for driving the screw and sleeve therein axially in a direction opposite said retraction for forcing the plasticated material from the chamber, and valve means disposed in the barrel adjacent said other end of the screw and sleeve combination and connected thereto, the valve means being movable from an open position allowing flow of material from within the sleeve into the chamber to a closed position sealing the sleeve from the chamber in response to movement of the screw and sleeve toward an end of the bore opposite the rotor.

* * * * *